Figure 1:
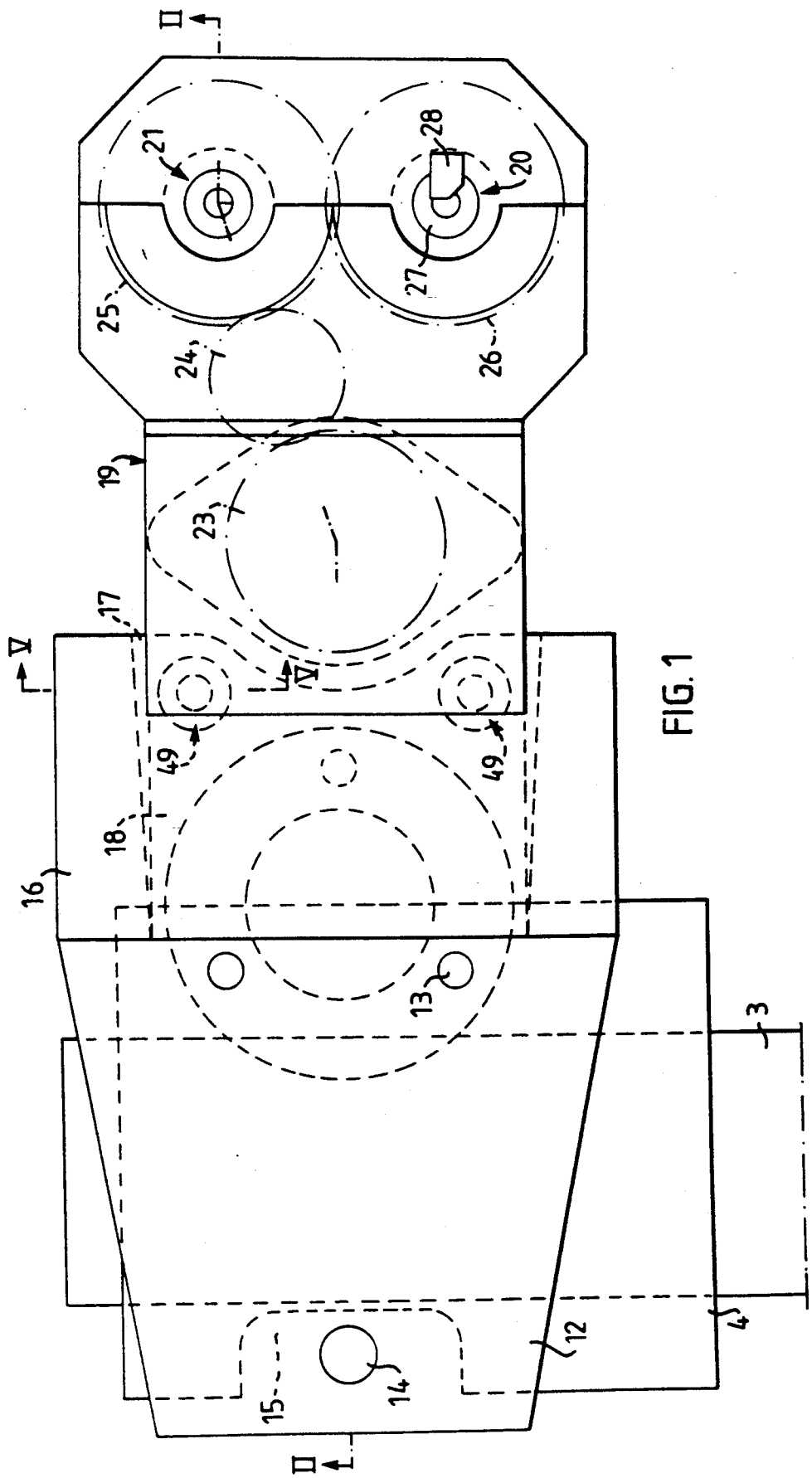

United States Patent [19]

Mattsson

[11] Patent Number: 5,288,185
[45] Date of Patent: Feb. 22, 1994

[54] PROCESS AND DEVICE FOR FORMING ELECTRODES IN A SPOT WELDING GUN OR THE LIKE

[75] Inventor: Karl-Erik Mattsson, Näsum, Sweden

[73] Assignee: AB Volvo, Goteborg, Sweden

[21] Appl. No.: 890,584

[22] PCT Filed: Jan. 10, 1991

[86] PCT No.: PCT/SE91/00016

§ 371 Date: Aug. 13, 1992

§ 102(e) Date: Aug. 13, 1992

[87] PCT Pub. No.: WO91/10532

PCT Pub. Date: Jul. 25, 1991

[30] Foreign Application Priority Data

Jan. 10, 1990 [SE] Sweden ................. 9000076

[51] Int. Cl.⁵ .................... B23C 1/20; B23K 11/30
[52] U.S. Cl. .................... 409/131; 219/119; 409/140; 409/181
[58] Field of Search ............. 409/140, 181, 132, 131; 408/203.5; 219/119, 91.2

[56] References Cited

U.S. PATENT DOCUMENTS

| | | | |
|---|---|---|---|
| 2,418,767 | 4/1947 | Hall | 409/181 X |
| 2,930,289 | 3/1960 | Swarts | 409/181 X |
| 3,128,672 | 4/1964 | O'Connor et al. | 408/130 |
| 3,820,437 | 6/1974 | Dyer et al. | 409/175 |

FOREIGN PATENT DOCUMENTS

| | | | |
|---|---|---|---|
| 2855041 | 6/1980 | Fed. Rep. of Germany . | |
| 3740230 | 6/1988 | Fed. Rep. of Germany | 219/119 |
| 2589767 | 5/1987 | France . | |
| 91988 | 7/1981 | Japan | 219/119 |
| 61-229484 | 10/1986 | Japan . | |
| 62-81279 | 4/1987 | Japan . | |
| 4-17983 | 1/1992 | Japan | 219/119 |
| 8302613 | 11/1984 | Sweden . | |
| 524348 | 8/1940 | United Kingdom | 219/119 |
| 624590 | 6/1949 | United Kingdom | 409/140 |
| 1189104 | 4/1970 | United Kingdom | 409/140 |

*Primary Examiner*—William Briggs
*Attorney, Agent, or Firm*—Burns, Doane, Swecker & Mathis

[57] ABSTRACT

The invention relates to a process and a device for dressing truncated conical tips of electrodes in a spot welding gun, press or the like. According to the process, each electrode tip is dressed both on its truncated conical lateral surface on its end surface. In a first machining step, the electrode tip is inserted into a cavity in a first tool for machining the lateral surface or the end surface until the other of these two surfaces comes into contact with an abutment, whereafter the electrode tip in a second machining step is inserted into a cavity in a second tool for machining the end surface of the lateral surface until the surface which has been machined in the first machining steps comes into contact with an abutment. The device according to the invention comprises a motor driven, rotary tool for machining the truncated conical lateral surface and a second motor driven, rotary tool form machining the end surface of the electrode tip. The first tool is provided with an abutment for the end surface of the electrode tip, and the second tool is provided with an abutment for the lateral surface of the electrode tip.

13 Claims, 3 Drawing Sheets

PROCESS AND DEVICE FOR FORMING ELECTRODES IN A SPOT WELDING GUN OR THE LIKE

The invention relates to a process and a device for dressing truncated conical tips on electrodes in a spot welding machine or the like. In the process, each electrode tip is dressed or reconditioned by insertion in a cavity in a tool for machining the tip. The device comprises a tool mounted on a frame for machining the electrode tips, said tool consisting of a motor driven, rotating tool with at least one truncated conical cavity of a shape corresponding to the shape of the truncated conical lateral surface of the electrode tip.

In spot welding, it is important that the tips of the electrodes in the spot welding machine has the correct shape and size to produce high quality welds. During welding, the electrode tips are subjected to wear and pick-up. In order to maintain high quality of the spot welds, the electrode tips, after a predetermined number of welds, must be dressed or reconditioned so that they maintain the correct shape and dimensions. This can be done manually by filing or grinding, or the electrodes can be dressed in a motor driven dressing device. Such devices are used with advantage for dressing the tips of electrodes in spot welding guns or other machines operated by means of industrial robots. The robot can be programmed, after a predetermined number of welds, to move the spot welding gun to the dressing device, whereupon the dressing operation is initiated.

It is known, in automatic dressing, to use a tool mounted on a frame with two oppositely directed, conical cavities with rotating milling tools. The milling tools are set in rotation and the electrodes of the spot welding machine are each inserted into an individual cavity, whereupon the spot welding gun is used to provide a clamping force which is only a fraction of the clamping force used during welding.

The result of the dressing operation depends on the clamping force of the welding gun and the length of the dressing period. It is difficult to regulate these parameters to achieve an acceptable final result. If the clamping force is too high and/or the dressing period is too long, more material than is necessary is machined off the electrodes, which unnecessarily increases electrode use. The shape of the electrodes may also become incorrect, leading to poor weld quality.

A dressing method has also been suggested where the electrode tips are inserted one at the time into a cavity in a tool, the electrode being pressed against the tool with a force which is balanced by the fact that the tool is spring-biased in the opposite direction. Here too, however, the dressing result will be dependent on the period during which the tool works.

The purpose of the present invention is to provide a process and a device of the type described by way of introduction, whereby the process and the device remove the above mentioned disadvantages of previously known processes and devices and make possible maximum use of the welding electrodes at the same time as high welding quality is maintained. this is achieved according to the invention by a process of the type described by way of introduction which has the features disclosed in the characterizing clause of claim 1, and a device of the type described by way of introduction which has the features disclosed in the characterizing clause of claim 4.

The invention will be described in more detail below with reference to the accompanying drawings, which show one embodying example.

Figure 2:
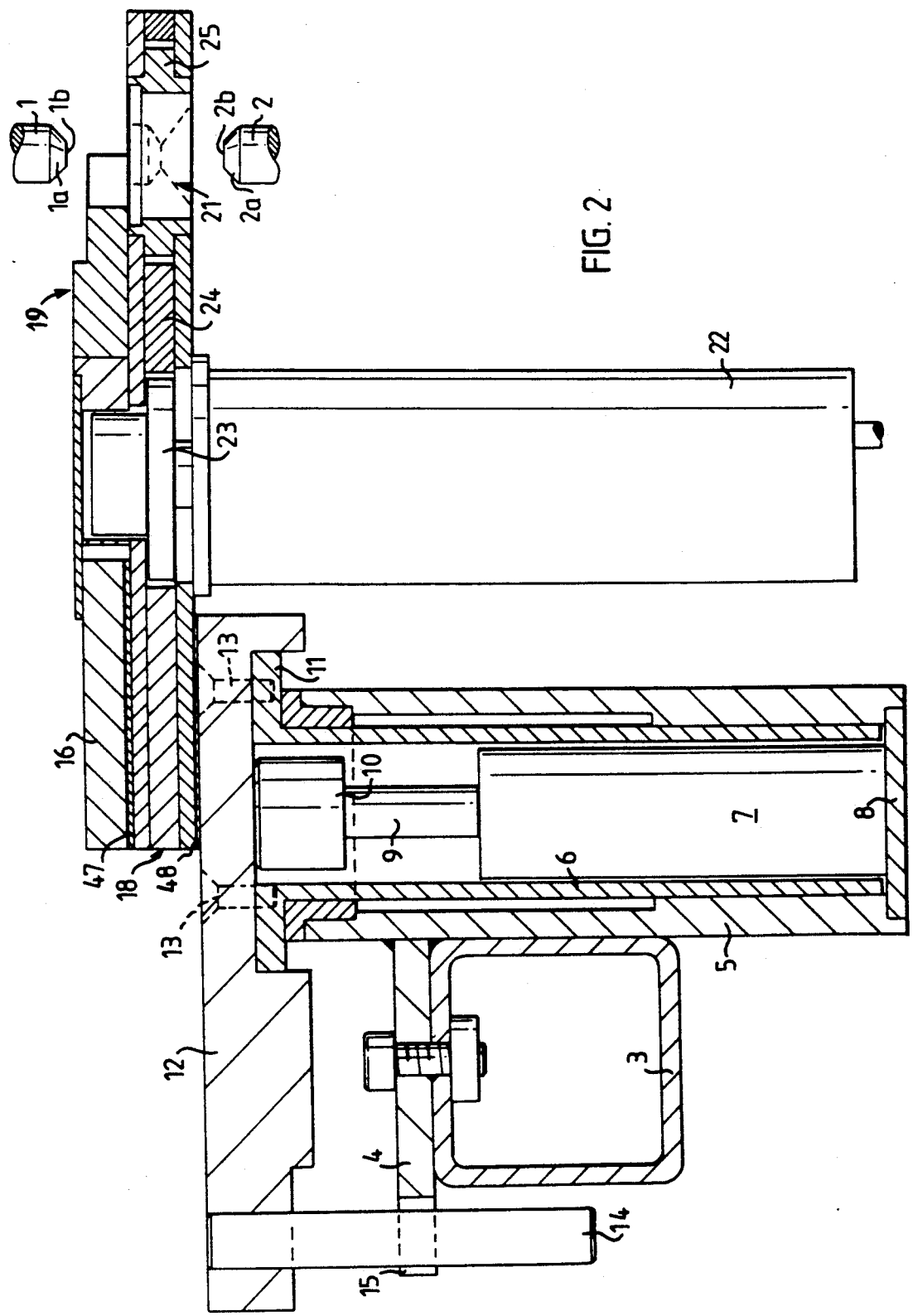
Figure 3:
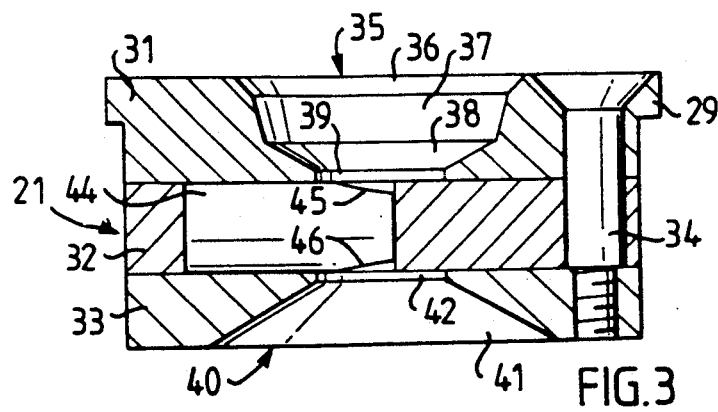
Figure 4:
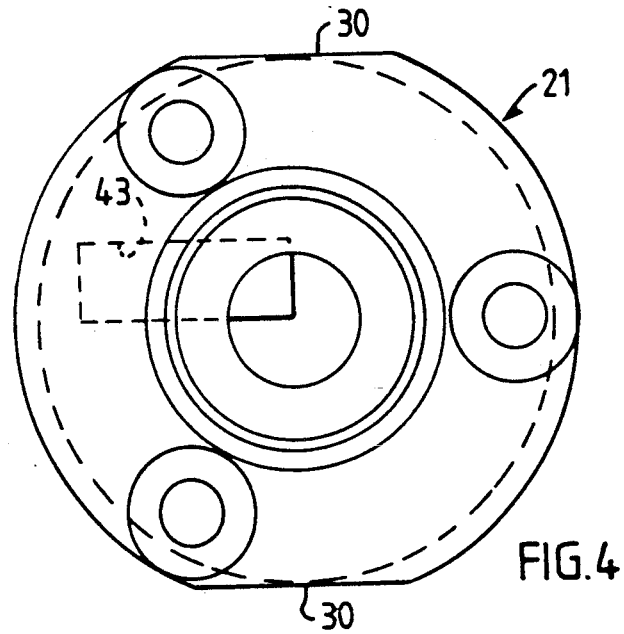
Figure 5:
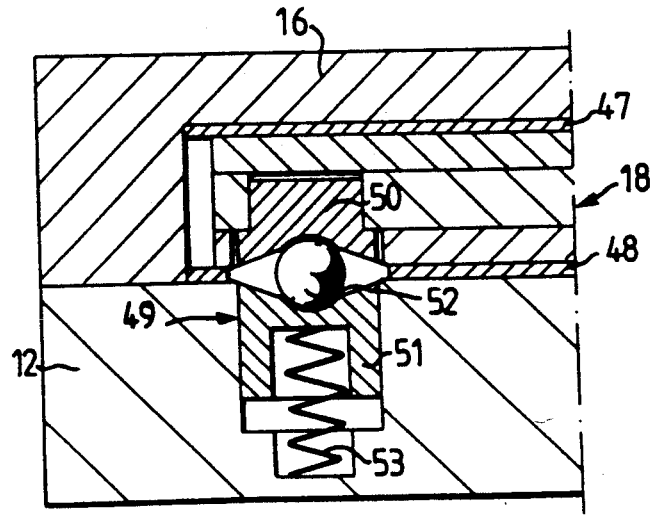

FIG. 1 is a somewhat schematic plan view of a device according to the invention, FIG. 2 shows a section along the line II—II in FIG. 1, FIG. 3 shows a section on a larger scale through a tool in the device according to FIGS. 1 and 2, FIG. 4 is a plan view of the tool in FIG. 3, and FIG. 5 shows a section along the line V—V in FIG. 1.

The drawings show a device according to the invention for dressing truncated conical tips of electrodes in a spot welding gun or press, and the device shown in the drawings is designed for simultaneous dressing of the opposing tips of two electrodes 1 and 2, which are mounted in a spot welding gun or press (not shown) and of which only the free ends are shown in FIG. 2. The electrode 1 has a truncated conical lateral surface 1a and an essentially planar or somewhat convex end surface 1b, while the electrode 2 has in a corresponding manner a truncated conical lateral surface 2a and an essentially planar or somewhat convex end surface 2b.

The device according to the invention is supported by an arm 3. If the electrodes 1 and 2 are mounted in a spot welding gun supported by an industrial robot or the like, the arm 3 can be fixed so as to hold the device in a predetermined position, and the industrial robot can be programmed to move the electrodes 1 and 2 to the correct position relative to the device before dressing is initiated. If the electrodes 1 and 2 are mounted in a fixed welding press, the arm 3 can be swingable or displaceable to place the device in the correct position relative to the electrodes before dressing is initiated.

The arm 3 supports a plate 4, which is securely joined to the arm 3 and to an essentially vertical cylinder 5. Within the cylinder 5, there is an inner cylinder 6 displaceably mounted. A pressure cylinder 7 is mounted inside the inner cylinder 6 and has one end joined to an end plate 8 which seals the lower end of the cylinder 5. A piston rod 9 extends from the other end of the pressure cylinder 7, and this piston rod has at its free end a support means 10.

The inner cylinder 6 has at its upper end a radial, outwardly directed flange 11, which is located above the cylinder 5 and extends radially outside the cylinder 5. The flange 11 has thereon a supporting plate 12 which is mounted by screws 13, for example. The supporting plate 12 extends over the arm 3 and the plate 4 and has at its end extending beyond the arm 3 a pin 14 which is directed downwards and extends through a notch 15 in the plate 4.

Above the supporting plate 12 there is a holder means 16 mounted at the portion of the supporting plate 12 located above the cylinder 5 and extending away from the arm 3. The holder means 16 has an essentially inverted U-shape defining together with the supporting plate 12 a channel 17 which is essentially rectangular in cross-section. The channel 17 broadens somewhat, as can be seen from FIG. 1, as one moves away from the arm 3, the purpose of which will be described in more detail below.

Into the channel 17 there is inserted from the free end of the supporting plate 12, i.e. from its end remote from the arm 3, an insertion portion 18 of a tool holder 19. The tool holder 19 supports at its end remote from the holder means 16 two tools 20 and 21 for dressing the electrodes 1 and 2 in the manner to be described in more detail below.

A drive motor 22 is provided with a gear 23, which drives an intermediate gear 24, which in turn drives a gear ring 25, with which the tool 21 is joined. The gear ring 25 engages in turn a gear ring 26 which is joined to the tool 20 for driving said tool. This means that when the drive motor 22 is turned on, the tools 20 and 21 will rotate simultaneously but in opposite directions.

The tool 20 is intended for machining the truncated conical lateral surfaces 1a, 2a of the electrodes 1, 2, respectively, and comprises an essentially cylindrical body which is joined to the gear ring 26 and is provided with a truncated conical cavity 27 at each end of the cylindrical body. Furthermore, the tool 20 comprises a cutting blade 28 with a cutting edge along each of the cavities 27, so that the cutting blade 28 can cut the truncated conical lateral surfaces 1a, 2a on the electrodes 1, 2 when they are inserted into the cavities 27. The cavities 27 are also provided with a bottom, against which the end surfaces 1b, 2b of the electrodes 1, 2 will abut when the lateral surfaces 1a, 2a have been machined to the desired degree. Thereby the machining of these lateral surfaces 1a, 2a of each electrode is terminated, and by suitable positioning of the bottom of the cavity 27 and the cutting edge of the cutting blade 28 it is possible to provide sufficient machining of each lateral surface 1a, 2a to give it the desired shape, said machining at the same time being sufficiently small to avoid unnecessary removal of material from the electrodes 1, 2, which would reduce the life of the electrodes. This type of tool is well known and is described, for example, in Swedish patent application 8302613-8, to which reference is made for more detailed description of this type of tool.

The tool 21 is intended to mill the end surface 1b, 2b of each electrode 1, 2, respectively, and the tool 21 is shown in more detail in FIGS. 3 and 4. It is evident from these Figures that the tool 21 consists of an essentially cylindrical body, which has in its upper portion as seen in FIG. 3 a radially extending flange 29, provided with two flat portions 30 which in the embodiment shown here are arranged diametrically opposed to each other, but they can also be arranged in another manner. Alternatively, it is possible to use only one flat portion or more than two flat portions. With the aid of the flat portions 30, the cylindrical body of the tool 21 is drivingly connected to the gear ring 25 in a known manner. As is especially evident from FIG. 3, the cylindrical body of the tool 21 is composed of three plates 31-33, namely an upper plate 31, an intermediate plate 32 and a lower plate 33. The plates 31-33 are joined together by means of a number of screws 34, extending through clearance holes in the upper plate 31 and the intermediate plate 32 and being screwed into threaded holes in the lower plate 33. In this manner, the three plates 31-33 form together the cylindrical body. If so required, two or more guide pins (not shown) can be inserted through holes in the plates 31-33 to align the plates relative to each other.

The upper plate 31 is provided with the above mentioned flange 29, as well as a central opening 35. The central opening 35 has three truncated conical portions 36, 37 and 38 as well as a cylindrical portion 39. The truncated conical portions 36-38 taper downwards from the upper surface of the upper plate 31, and the cylindrical portion 39 extends down to the lower surface of the upper plate 31. The truncated conical portions 36 and 37 are intended to guide the electrode 1 into the tool 21, and the truncated conical portion 38 and the cylindrical portion 39 are intended to determine how much the end surface 1b of the electrode 1 is to be cut.

The lower plate 23 has a central opening 40, which comprises a truncated conical portion 41 and a cylindrical portion 42 connected thereto. The truncated conical portion 41 extends from the lower surface of the lower plate 31 and is tapered upwards, while the cylindrical portion 42 is connected to the truncated conical portion 41 and extends up to the upper surface of the lower plate 33. The truncated conical portion 41 and the cylindrical portion 42 are designed to limit the machining of the end surface 2b of the electrode 2, as will be described in more detail below.

The intermediate plate 34 is made with a cavity 43, in which a cutting blade 44 is mounted. The cutting blade 44 is clamped between the upper plate 31 and the lower plate 33 when the plates 31, 32 and 33 are assembled, as shown in FIG. 3. The cavity 43 and the cutting blade 44 have one edge which extends essentially radially in relation to the common axis of the plates 31-33 and the openings 35 and 40 and extends somewhat beyond said axis. The cutting blade 44 has cutting edges 45 and 46 at its upper and lower side, respectively, said cutting edges 45 and 46 extending radially essentially at the boundaries between the plates 31, 32 and 32, 33, respectively, to machine the end surface 1b, 2b of each electrode 1, 2.

As stated above, the channel 17 in which the insertion portion 18 of the tool holder 19 is inserted, is somewhat wider at its end closest to the extending portion of the tool holder 19. This means that the insertion portion 18 will be able to pivot somewhat laterally in the channel 17. In order to be able to perform such a movement without excessive friction, thin intermediate layers 47 and 48 are arranged between the insertion portion 18 and the holder means 16 and between the insertion portion 18 and the supporting plate 12. The intermediate layers 47 and 48 are made of a material with a low coefficient of friction, for example polytetraflouroethylene or a similar material.

The movements described above of the tool holder 19 relative to the holder means 16 and the supporting plate 12 are limited by two ball couplings 49, which are arranged between the supporting plate 12 and the insertion portion 18 of the tool holder 19. One of the ball couplings 49 is shown in section in FIG. 5 and consists essentially of an upper ball socket 50, which is built into the insertion portion 18, a lower ball socket 51, which is built into the supporting plate 12, a ball 52 arranged between the sockets 50 and 51, and a compression spring 53 held between the lower ball socket 51 and the supporting plate 12 to press the lower ball socket 51 against the ball 52 and the upper ball socket 50. As can be seen in FIG. 5, the sockets 50 and 51 are designed so that their surfaces facing the ball 52 have a centering position, from which the ball 52 can only be pressed under the influence of a relatively large lateral force. Outside the centering position, the surfaces of the sockets 50 and 51 facing the ball 52 have a relatively gentle inclination relative to a plane perpendicular to the longitudinal direction of the ball coupling 49. This means that the ball 52 will be held in its central position, but that it can be moved from this position to permit the insertion portion 18 to move slightly in various directions. The insertion portion 18 is thereafter returned to its original position with the aid of the ball couplings 49. In the embodiment shown, two ball couplings 49 are used, but it is also of course possible to use a single ball coupling or more than two such couplings, if this should be so desired. By changing the shape of the surfaces of the sockets 50 and 51, cooperating with the ball 52, and by changing the characteristics of the spring 53, it is possible to adapt the return force exerted by the ball couplings 49 on the insertion portion 18 if it is moved from its original position.

As stated above, the ball coupling 49 permit minor movements between the insertion portion 18 of the tool holder 19 and the supporting plate 12. The supporting plate 12 and thus the tool holder 19 are also vertically adjustable, as can be seen in FIG. 2, by extending the piston rod 9 from the pressure cylinder 7 or retracting the same. The pressure cylinder 7 can thus be used to balance the device, so that the supporting plate 12 and the tool holder 19 are kept in a predetermined intermediate vertical position, from which it can be moved under the influence of external forces, e.g. from the electrodes 1 and 2 during the dressing operation.

In performing the dressing operation according to the invention by means of the device described above and shown in the drawings, the electrodes 1 and 2 are first separated and brought to a position in alignment with the central axis of the tool 20. This step can be completed either by moving the entire device to this aligned position or by moving the electrodes to said aligned position, the former alternative being used primarily for so-called fixed machines, where the spot welding press is built into a machine and cannot be moved. The latter alternative relates to moveable spot welding guns, for example those supported by industrial robots or the like. When the electrodes are in alignment with the tool 20, the electrodes 1 and 2 are brought together so that they are inserted into the tool 20. The clamping force of the spot welder is set at a value to provide the desired pressure against the cutting blade 28. The clamping force during dressing can, for example, be between 0.5 kN and the value used for spot welding sheet metal, e.g. 3 kN. The drive motor 22 is turned on so that the tools 20 and 21 begin rotating. The tool 20 will thus machine the truncated conical lateral surfaces 1a and 2a of the electrodes 1 and 2 until the end surfaces 1b and 2b of the electrodes abut against their abutment surfaces, whereupon the machining stops. The truncated conical lateral surfaces 1a, 2a, respectively, thus have the desired shape and the spot weld gun or press is opened, so that the electrodes 1 and 2 are separated.

After the machining of the truncated conical lateral surfaces 1a and 2a, the electrodes 1 and 2 are moved to the tool 21. This step can be performed either by moving the electrodes or by moving the device. In order to move the device while leaving the electrodes stationary, it is possible to use the pressure cylinder 7 to turn the supporting plate 12, this rotary movement being limited by the pin 14 coming into engagement with one end or the other of the notch 15 in the plate 4. The size of the notch 15 is selected so that the swinging movement of the supporting plate 12 between the end positions of the pin 14 will provide a swinging movement of the tool holder 19 corresponding to the distance between the central axes of the tools 20 and 21.

When the electrodes 1 and 2 are in alignment with the tool 21, the welding machine brings the electrodes 1 and 2 together with a clamping force which is appreciably smaller than that used for spot welding. The end surfaces 1b and 2b are thus brought into engagement with the cutting edges 45 and 46, respectively, of the cutting blade 44. The end surfaces 1b and 2b are machined by rotation of the tool 21 until the lateral surface 1a of the electrode 1 comes into contact with the truncated conical portion 38 of the cavity 35 and the lateral surface 2a of the electrode 2 comes into contact with the truncated conical portion 41 of the cavity 40. The height of the cylindrical portions 39, 42, respectively, in the cavities 35, 40, respectively, determines how much of the end surfaces 1b, 2b, respectively, is to be machined off. After this machining, the electrodes 1 and 2 are again separated thus completing the dressing of the electrode tips.

In the process described above, the lateral surfaces 1a, 2a are first machined until the end surfaces 1b, 2b abut against an abutment for termination of the machining, whereafter the end surfaces 1b, 2b are machined until the lateral surfaces 1a, 2a, respectively, come into contact with abutments for terminating the machining. It is of course also conceivable to perform the machining in the reverse order, i.e. first machining the end surfaces and then the lateral surfaces. Such a procedure would, however, have the disadvantage that the finished end surface would be used as an abutment surface when machining the lateral surface, and this can give rise to damage to the end surfaces. Since the shape and size of the end surfaces is crucial to the welding result, damage to the end surfaces can reduce the life of the electrode, since it would require frequent redressing.

When dressing the electrodes 1 and 2 in the tool 20 or 21, the ball couplings 49 make possible adjustment of the tool holder 19 to compensate for any errors in alignment of the electrodes 1, 2 relative to the tools 20 and 21, respectively. At the same time, the balancing of the device by means of the pressure cylinder 7 enables the device to be moved in the axial directions of the tools 20 and 21, respectively, so that the clamping force of the spot welder can be used to provide pressure against the tools, in a so-called stationary machine for spot welding.

I claim:

1. A process for dressing truncated conical tips of electrodes in a spot welding machine or the like, in which said process each electrode tip is dressed by insertion in a cavity in a tool for machining the tip, wherein each electrode tip is dressed both on its truncated conical lateral surface and on its end surface adjoining the minor diameter of the lateral surface, the electrode tip, in a first machining step, being inserted into a cavity in a first tool for machining the lateral surface or the end surface until the other of these two surfaces comes into contact with an abutment for determining a terminal position for machining, whereafter the electrode tip in a second machining step is inserted into a cavity in a second tool for machining the end surface or the lateral surface until the surface which has been machined in the first machining step comes into contact with an abutment for determining a terminal position for the machining.

2. Process according to claim 1, wherein, in a first machining step, the truncated conical lateral surface of the electrode tip is machined to a predetermined shape, whereafter the end surface of the electrode tip, in a second machining step, is machined to a predetermined shape and size.

3. Process according to claim 1 or 2, wherein the electrode tips of two opposing electrodes in a spot welding gun or press or the like are dressed at the same time by insertion into oppositely directed cavities in the respective tools.

4. A device for dressing truncated conical tips of electrodes in a spot welding gun, press or the like, said device comprising:
   a first tool mounted on a frame for machining the electrode tips, said tool being a motor driven, rotary tool with at least one truncated conical cavity with a shape corresponding to the shape of the truncated conical lateral surface of the electrode tip,
   a second tool arranged on the frame, said second tool being a motor driven, rotary tool with at least one cavity, the bottom of which has a shape corresponding to the shape of the end surface of the electrode tip,
   said first tool being provided with an abutment against which the end surface of the electrode tip is designed to come into contact after completed machining of the lateral surface,
   said second tool being provided with an abutment against which the lateral surface of the electrode is designed to come into contact after completed machining of the end surface.

5. Device according to claim 4, wherein a drive motor is drivingly coupled to one of the tools, which is in turn drivingly coupled to the other tool.

6. Device according to claim 4 or 5, wherein the frame comprises a tool holder, which is displaceably arranged between a supporting plate and holder means, the movements of said tool holder being limited by at least one spring loaded ball coupling.

7. Device according to one of claims 4 or 5 wherein the tool for machining the end surfaces of the electrodes comprises, on one hand, an intermediate plate with a cavity, in which a cutting blade is inserted, and, on the other hand, two plates arranged on either side of the intermediate plate, of which said plates at least one is provided with a through-hole for insertion of an electrode for dressing with the aid of the cutting blade inserted in the intermediate plate, said plates being held clamped securely to each other by means of fasteners, so that the cutting blade is securely held between the two outer plates.

8. Device according to one of claim 4 or 5, wherein each of the tools is made with oppositely directed cavities, which are concentric with the rotational axes of the tool, for simultaneous dressing of two electrodes, the tips of which are directed towards each other.

9. A device for dressing an electrode tip having an end surface and a truncated conical lateral surface, said device comprising:
   a frame;
   a first tool mounted on said frame, said first tool being a motor driven, rotary tool having means for machining the truncated conical lateral surface of said electrode tip;
   a first abutment provided on said first tool, said first abutment arranged so as to contact the end surface of the electrode tip after the lateral surface of the electrode tip is machined to a desired extent and to prevent further machining of the lateral surface;
   a second tool mounted on said frame, said second tool being a motor driven, rotary tool having means for machining the end surface of said electrode tip; and
   a second abutment provided on said second tool, said second abutment arranged so as to contact the lateral surface of the electrode tip after said end surface of the tip is machined to a desired extent and to prevent further machining of the end surface.

10. Device according to claim 9, wherein said second abutment includes a truncated conical portion concentrically arranged with respect to said second tool machining means.

11. Device according to claim 10, further comprising a cylindrical portion between said second tool machining means and said truncated conical portion.

12. Device according to claim 9, wherein said second abutment includes two truncated conical portions concentrically arranged with respect to said second tool machining means, wherein said two truncated conical portions are connected to each other.

13. Device according to claim 12, further comprising a cylindrical portion between said second tool machining means and said two truncated conical portions.

* * * * *